United States Patent
Park et al.

(10) Patent No.: US 10,218,608 B2
(45) Date of Patent: Feb. 26, 2019

(54) TREE STRUCTURED SPREADING CODES

(71) Applicant: QUALCOMM Incorporated, San Diego, CA (US)

(72) Inventors: Seyong Park, San Diego, CA (US); Wei Zeng, San Diego, CA (US); Haitong Sun, San Diego, CA (US); Joseph Binamira Soriaga, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/482,510

(22) Filed: Apr. 7, 2017

(65) Prior Publication Data

US 2018/0097724 A1    Apr. 5, 2018

Related U.S. Application Data

(60) Provisional application No. 62/402,626, filed on Sep. 30, 2016.

(51) Int. Cl.
*H04L 5/00* (2006.01)
*G06F 17/22* (2006.01)
(Continued)

(52) U.S. Cl.
CPC .......... *H04L 45/48* (2013.01); *G06F 17/2252* (2013.01); *G06F 17/2258* (2013.01);
(Continued)

(58) Field of Classification Search
None
See application file for complete search history.

(56) References Cited

U.S. PATENT DOCUMENTS

| | | | |
|---|---|---|---|
| 7,990,927 B2 | 8/2011 | Choi et al. | |
| 9,131,465 B2 | 9/2015 | Pi | |

(Continued)

FOREIGN PATENT DOCUMENTS

| | | | |
|---|---|---|---|
| EP | 3148142 A1 | 3/2017 | |
| WO | 2014026228 A1 | 2/2014 | |

(Continued)

OTHER PUBLICATIONS

International Search Report and Written Opinion—PCT/US2017/050501—ISO/EPO—dated Nov. 23, 2017.

*Primary Examiner* — Yaotang Wang

(74) *Attorney, Agent, or Firm* — Patterson & Sheridan, LLP

(57) ABSTRACT

Various additional and alternative aspects are described herein. In some aspects, the present disclosure provides a method of communication by an apparatus. The method includes selecting one or more resources for transmitting data of a first data stream based on an acyclic graph. The selected resources conform to the acyclic graph comprising data streams at odd levels of the acyclic graph and resources at even levels of the acyclic graph. The acyclic graph includes edges between each level of the acyclic graph. The edges connect the resources allocated to each data stream. The method further includes transmitting the data of the first data stream on the selected one or more resources.

29 Claims, 10 Drawing Sheets

(51) Int. Cl.
*H04B 1/713* (2011.01)
*H04B 7/212* (2006.01)
*H04J 13/00* (2011.01)
*H04J 13/12* (2011.01)
*H04L 25/03* (2006.01)
*H04L 27/26* (2006.01)
*H04W 72/04* (2009.01)
*H04L 12/753* (2013.01)

(52) U.S. Cl.
CPC ........... *H04B 1/713* (2013.01); *H04B 7/2121* (2013.01); *H04J 13/0025* (2013.01); *H04J 13/0074* (2013.01); *H04J 13/12* (2013.01); *H04L 5/0021* (2013.01); *H04L 25/03331* (2013.01); *H04L 27/26* (2013.01); *H04W 72/0446* (2013.01)

(56) References Cited

U.S. PATENT DOCUMENTS

| | | | |
|---|---|---|---|
| 9,509,379 | B2 | 11/2016 | Taherzadehboroujeni et al. |
| 2014/0140360 | A1* | 5/2014 | Nikopour ................ H04J 13/00 370/479 |
| 2017/0111142 | A1* | 4/2017 | He ......................... H04L 1/0052 |
| 2017/0302500 | A1* | 10/2017 | Lu ........................... H04L 29/08 |

FOREIGN PATENT DOCUMENTS

| | | |
|---|---|---|
| WO | 2015152581 A1 | 10/2015 |
| WO | 2016000197 A1 | 1/2016 |

\* cited by examiner

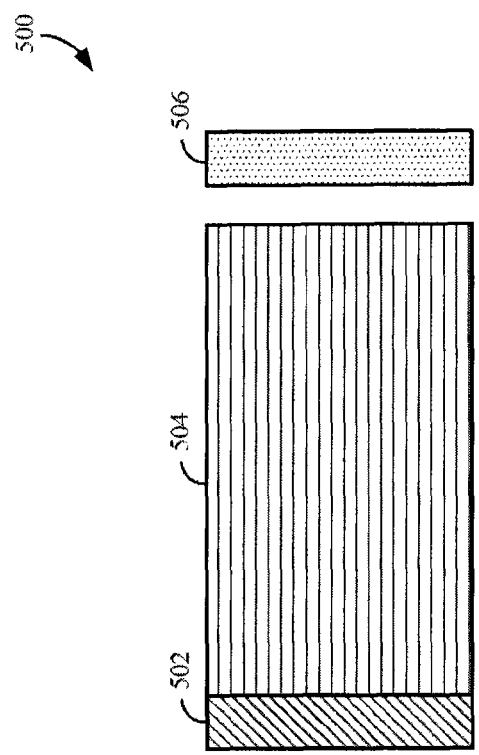
FIG. 5
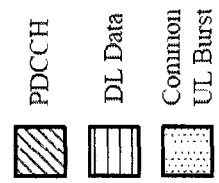

TREE STRUCTURED SPREADING CODES

CROSS-REFERENCE TO RELATED APPLICATIONS

This application claims the benefit of U.S. Provisional Patent No. 62/402,626, filed Sep. 30, 2016. The content of the provisional application is hereby incorporated by reference in its entirety.

TECHNICAL FIELD

The technology discussed herein relates, generally, to wireless communication systems, and, more particularly, to using tree structured spreading codes for wireless communication.

INTRODUCTION

Wireless communication networks are widely deployed to provide various communication services such as telephony, video, data, messaging, broadcasts, and so on. Such networks, which are usually multiple access networks, support communication for multiple users by sharing the available network resources. Within such wireless networks a variety of data services may be provided, including voice, video, and emails. The spectrum allocated to such wireless communication networks can include licensed spectrum and/or unlicensed spectrum. As the demand for mobile broadband access continues to increase, research and development continue to advance wireless communication technologies not only to meet the growing demand for mobile broadband access, but also to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In some aspects, the present disclosure provides a method of communication by an apparatus. The method includes selecting one or more resources for transmitting data of a first data stream based on an acyclic graph. The selected resources conform to the acyclic graph comprising data streams at odd levels of the acyclic graph and resources at even levels of the acyclic graph. The acyclic graph includes edges between each level of the acyclic graph. The edges connect the resources allocated to each data stream. The method further includes transmitting the data of the first data stream on the selected one or more resources.

In some aspects, the present disclosure provides an apparatus for communication. The apparatus includes means for selecting one or more resources for transmitting data of a first data stream based on an acyclic graph. The selected resources conform to the acyclic graph comprising data streams at odd levels of the acyclic graph and resources at even levels of the acyclic graph. The acyclic graph includes edges between each level of the acyclic graph. The edges connect the resources allocated to each data stream. The apparatus further includes means for transmitting the data of the first data stream on the selected one or more resources.

In some aspects, the present disclosure provides an apparatus for communication. The apparatus includes a memory and a processor. The processor is configured to select one or more resources for transmitting data of a first data stream based on an acyclic graph. The selected resources conform to the acyclic graph comprising data streams at odd levels of the acyclic graph and resources at even levels of the acyclic graph. The acyclic graph includes edges between each level of the acyclic graph. The edges connect the resources allocated to each data stream. The processor is further configured to transmit the data of the first data stream on the selected one or more resources.

In some aspects, the present disclosure provides a computer readable medium having stored thereon instructions for performing a method of communication by an apparatus. The method includes selecting one or more resources for transmitting data of a first data stream based on an acyclic graph. The selected resources conform to the acyclic graph comprising data streams at odd levels of the acyclic graph and resources at even levels of the acyclic graph. The acyclic graph includes edges between each level of the acyclic graph. The edges connect the resources allocated to each data stream. The method further includes transmitting the data of the first data stream on the selected one or more resources.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 5 is a diagram illustrating an example of a downlink (DL)-centric subframe according to some aspects of the present disclosure.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
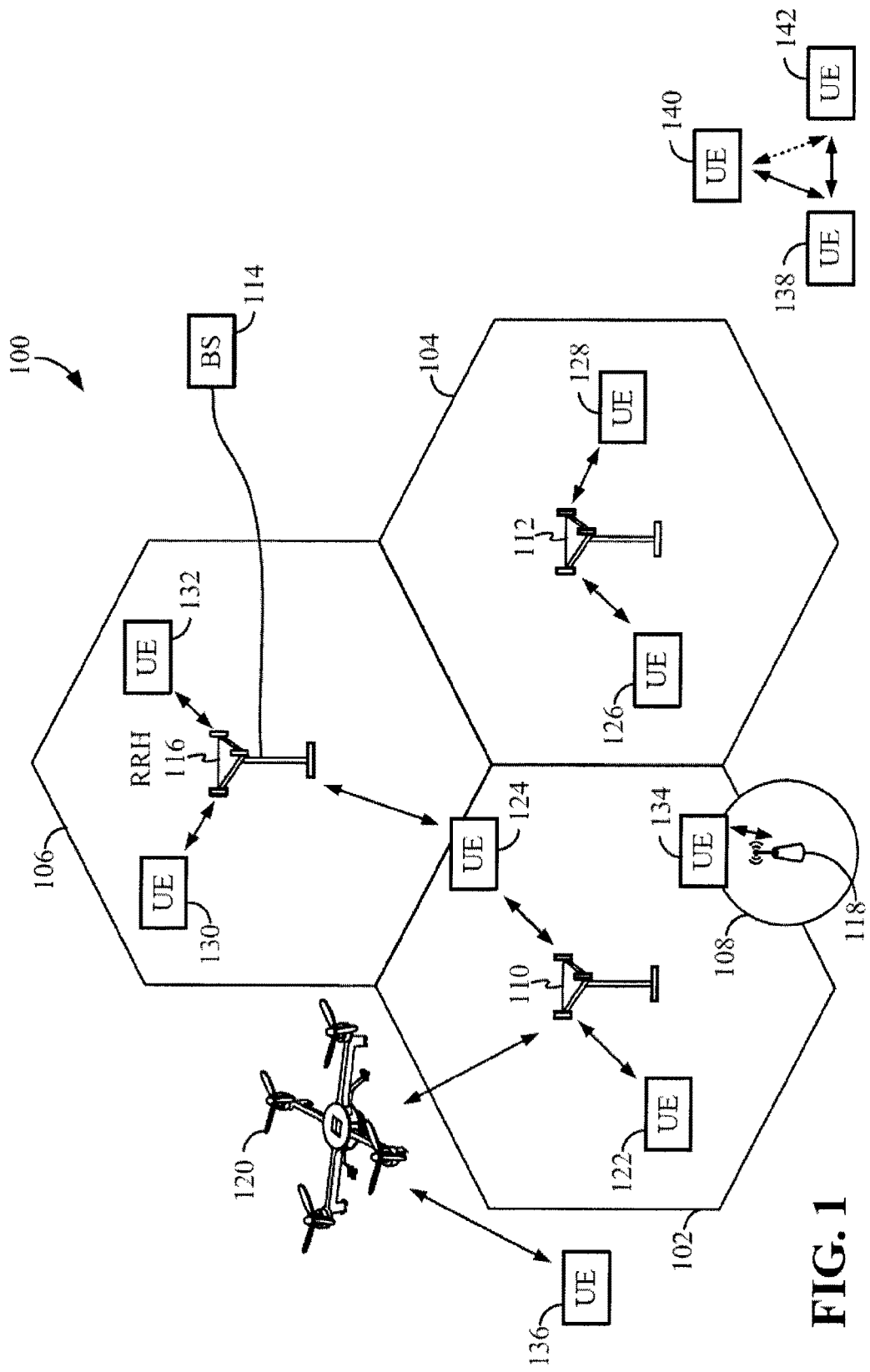
FIG. 1 is a diagram illustrating an example of an access network according to some aspects of the present disclosure.

The various concepts presented throughout this disclosure may be implemented across a broad variety of telecommunication systems, network architectures, and communication standards. Referring now to FIG. 1, as an illustrative example without limitation, a simplified schematic illustration of an access network 100 is provided.

The geographic region covered by the access network 100 may be divided into a number of cellular regions (cells), including macrocells 102, 104, and 106, and a small cell 108, each of which may include one or more sectors. Cells may be defined geographically (e.g., by coverage area) and/or may be defined in accordance with a frequency, scrambling code, etc. In a cell that is divided into sectors, the multiple sectors within a cell can be formed by groups of antennas with each antenna responsible for communication with mobile devices in a portion of the cell.

In general, a radio transceiver apparatus serves each cell. A radio transceiver apparatus is commonly referred to as a base station (BS) in many wireless communication systems, but may also be referred to by those skilled in the art as a base transceiver station (BTS), a radio base station, a radio transceiver, a transceiver function, a basic service set (BSS), an extended service set (ESS), an access point (AP), a Node B, an eNode B, or some other suitable terminology.

In FIG. 1, two high-power base stations 110 and 112 are shown in cells 102 and 104; and a third high-power base station 114 is shown controlling a remote radio head (RRH) 116 in cell 106. In this example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the access network 100 may include any number of wireless base stations and cells. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120. In some examples, the base stations may be interconnected to one another and/or to one or more other base stations or network nodes (not shown) in the access network 100 through various types of backhaul interfaces such as a direct physical connection, a virtual network, or the like using any suitable transport network.

The access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology.

Within the present document, a "mobile" apparatus need not necessarily have a capability to move, and may be stationary. Some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, and a personal digital assistant (PDA). A mobile apparatus may additionally be an "Internet of things" (IoT) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc.

Within the access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells. In another example, the quadcopter 120 may be configured to function as a UE. For example, the quadcopter 120 may operate within cell 102 by communicating with base station 110.

The air interface in the access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), or other suitable multiplexing schemes.

Within the access network 100, during a call with a scheduling entity, or at any other time, a UE may monitor various parameters of the signal from its serving cell as well as various parameters of neighboring cells. Further, depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). For example, UE 138 is illustrated communicating with UEs 140 and 142. In this example, the UE 138 is functioning as a scheduling entity, and UEs 140 and 142 utilize resources scheduled by the UE 138 for wireless communication. A UE may function as a scheduling entity in a peer-to-peer (P2P) network, and/or in a mesh network. In a mesh network example, UEs 140 and 142 may optionally communicate directly with one another in addition to communicating with the scheduling entity 138.

Figure 2:
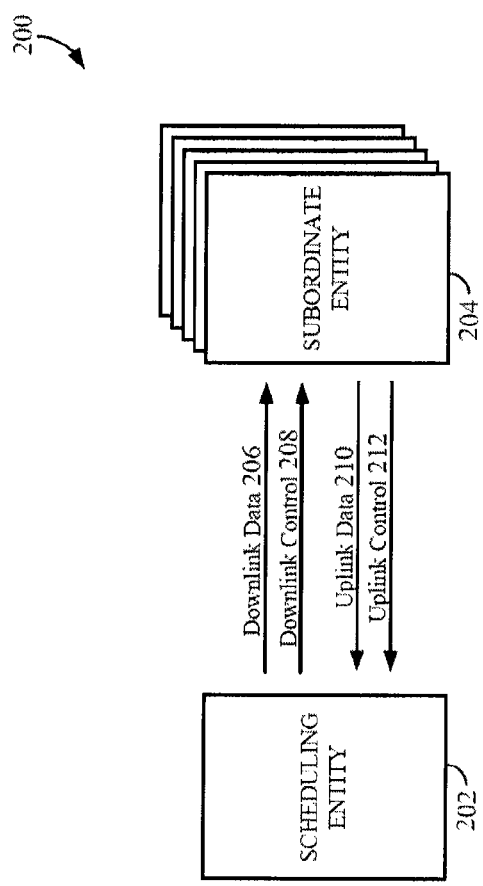
FIG. 2 is a diagram conceptually illustrating an example of a scheduling entity communicating with one or more subordinate entities according to some aspects of the present disclosure.

Thus, in a wireless communication network with a scheduled access to time-frequency resources and having a cellular configuration, a P2P configuration, and a mesh configuration, a scheduling entity and one or more subordinate entities may communicate utilizing the scheduled resources. Referring now to FIG. 2, a block diagram 200 illustrates a scheduling entity 202 and a plurality of subordinate entities 204. Here, the scheduling entity 202 may correspond to the base stations 110, 112, 114, and 118. In additional examples, the scheduling entity 202 may correspond to the UE 138, the quadcopter 120, or any other suitable node in the access network 100. Similarly, in various examples, the subordinate entity 204 may correspond to the UE 122, 124, 126, 128, 130, 132, 134, 136, 138, 140, and 142, or any other suitable node in the access network 100.

As illustrated in FIG. 2, the scheduling entity 202 may broadcast downlink data 206 to one or more subordinate entities 204 (the data may be referred to as downlink data). In accordance with certain aspects of the present disclosure, the term downlink may refer to a point-to-multipoint transmission originating at the scheduling entity 202. Broadly, the scheduling entity 202 is a node or device responsible for scheduling traffic in a wireless communication network, including the downlink transmissions and, in some examples, uplink data 210 from one or more subordinate entities to the scheduling entity 202. Another way to describe the system may be to use the term broadcast channel multiplexing. In accordance with aspects of the present disclosure, the term uplink may refer to a point-to-point transmission originating at a subordinate entity 204. Broadly, the subordinate entity 204 is a node or device that receives scheduling control information, including but not limited to scheduling grants, synchronization or timing information, or other control information from another entity in the wireless communication network such as the scheduling entity 202.

The scheduling entity 202 may broadcast a control channel 208 to one or more subordinate entities 204. Uplink data 210 and/or downlink data 206 may be transmitted using a transmission time interval (TTI). Here, a TTI may correspond to an encapsulated set or packet of information capable of being independently decoded. In various examples, TTIs may correspond to frames, subframes, data blocks, time slots, or other suitable groupings of bits for transmission.

Furthermore, the subordinate entities 204 may transmit uplink control information 212 to the scheduling entity 202. Uplink control information may include a variety of packet types and categories, including pilots, reference signals, and information configured to enable or assist in decoding uplink data transmissions. In some examples, the control information 212 may include a scheduling request (SR), i.e., request for the scheduling entity 202 to schedule uplink transmissions. Here, in response to the SR transmitted on the control channel 212, the scheduling entity 202 may transmit in the downlink control channel 208 information that may schedule the TTI for uplink packets. In a further example, the uplink control channel 212 may include hybrid automatic repeat request (HARQ) feedback transmissions, such as an acknowledgment (ACK) or negative acknowledgment (NACK). HARQ is a technique well-known to those of ordinary skill in the art, wherein packet transmissions may be checked at the receiving side for accuracy, and if confirmed, an ACK may be transmitted, whereas if not confirmed, a NACK may be transmitted. In response to a NACK, the transmitting device may send a HARQ retransmission, which may implement chase combining, incremental redundancy, etc. The channels illustrated in FIG. 2 are not necessarily all of the channels that may be utilized between a scheduling entity 202 and subordinate entities 204, and those of ordinary skill in the art will recognize that other channels may be utilized in addition to those illustrated, such as other data, control, and feedback channels.

Figure 3:
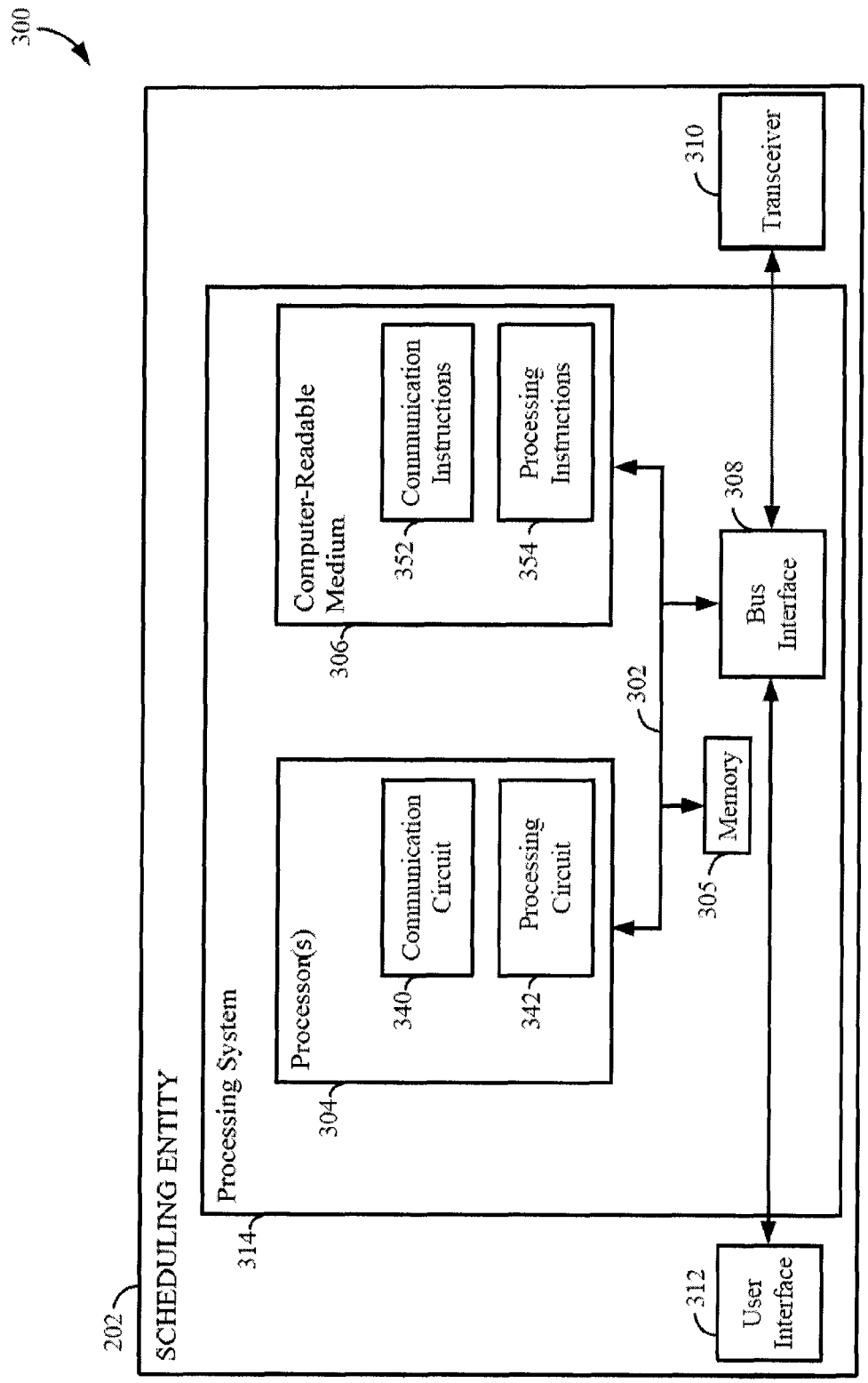
FIG. 3 is a diagram illustrating an example of a hardware implementation for a scheduling entity according to some aspects of the present disclosure.

FIG. 3 is a diagram 300 illustrating an example of a hardware implementation for scheduling entity 202 according to aspects of the present disclosure. Scheduling entity 202 may employ a processing system 314. Scheduling entity 202 may be implemented with a processing system 314 that includes one or more processors 304. Examples of processors 304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, scheduling entity 202 may be configured to perform any one or more of the functions described herein. That is, the processor 304, as utilized in scheduling entity 202, may be used to implement any one or more of the processes described herein.

In this example, the processing system 314 may be implemented with a bus architecture, represented generally by the bus 302. The bus 302 may include any number of interconnecting buses and bridges depending on the specific application of the processing system 314 and the overall design constraints. The bus 302 communicatively couples together various circuits including one or more processors (represented generally by the processor 304), a memory 305, and computer-readable media (represented generally by the computer-readable medium 306). The bus 302 may also link various other circuits such as timing sources, peripherals, voltage regulators, and power management circuits. A bus interface 308 provides an interface between the bus 302 and a transceiver 310. The transceiver 310 provides a means for communicating with various other apparatus over a transmission medium. Depending upon the nature of the apparatus, a user interface 312 (e.g., keypad, display, speaker, microphone, joystick) may also be provided.

At least one processor 304 is responsible for managing the bus 302 and general processing, including the execution of software stored on the computer-readable medium 306. The software, when executed by the processor 304, causes the processing system 314 to perform the various functions described below for any particular apparatus. The computer-readable medium 306 and the memory 305 may also be used for storing data that is manipulated by the processor 304 when executing software. In some aspects of the disclosure, the computer-readable medium 306 may include communication instructions 352. The communication instructions 352 may include instructions for performing various operations related to wireless communication (e.g., signal reception and/or signal transmission) as described herein. In some aspects of the disclosure, the computer-readable medium 306 may include processing instructions 354. The processing instructions 354 may include instructions for performing various operations related to signal processing (e.g., processing a received signal and/or processing a signal for transmission) as described herein.

At least one processor 304 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 306. The computer-readable medium 306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 306 may reside in the processing system 314, external to the processing system 314, or distributed across multiple entities including the processing system 314. The computer-readable medium 306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, at least one processor 304 may include a communication circuit 340. The communication circuit 340 may include one or more hardware components that provide the physical structure that performs various processes related to wireless communication (e.g., signal reception and/or signal transmission) as described herein. In some aspects of the disclosure, the processor 304 may also include a processing circuit 342. The processing circuit 342 may include one or more hardware components that provide the physical structure that performs various processes related to signal processing (e.g., processing a received signal and/or processing a signal for transmission) as described herein. The circuitry included in the processor 304 is provided as non-limiting examples. Other means for carrying out the described functions exists and is included within various aspects of the present disclosure. In some aspects of the disclosure, the computer-readable medium 306 may store computer-executable code comprising instructions configured to perform various processes described herein. The instructions included in the computer-readable medium 306 are provided as non-limiting examples. Other instructions configured to carry out the described functions exist and are included within various aspects of the present disclosure.

Figure 4:
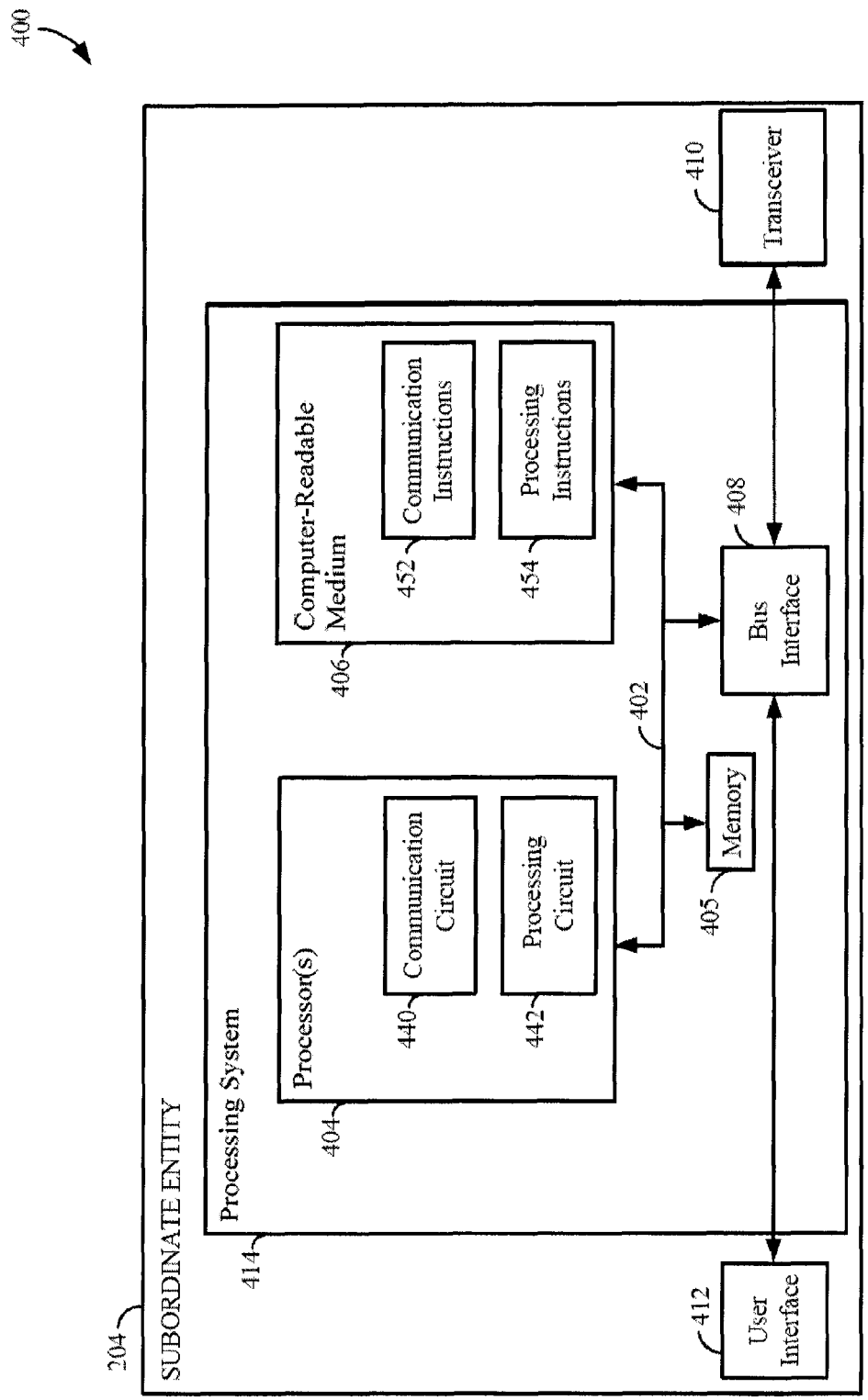
FIG. 4 is a diagram illustrating an example of a hardware implementation for a subordinate entity according to some aspects of the present disclosure.

FIG. 4 is a diagram 400 illustrating an example of a hardware implementation for subordinate entity 204 according to aspects of the present disclosure. Subordinate entity 204 may employ a processing system 414. Subordinate entity 204 may be implemented with a processing system 414 that includes one or more processors 404. Examples of processors 404 include microprocessors, microcontrollers, DSPs, FPGAs, PLDs, state machines, gated logic, discrete hardware circuits, and other suitable hardware configured to perform the various functionality described throughout this disclosure. In various examples, subordinate entity 204 may be configured to perform any one or more of the functions described herein. That is, the processor 404, as utilized in subordinate entity 204, may be used to implement any one or more of the processes described herein.

In this example, the processing system 414 may be implemented with a bus architecture, represented generally by the bus 402. The bus 402 may include any number of interconnecting buses and bridges depending on the specific application of the processing system 414 and the overall design constraints. The bus 402 communicatively couples together various circuits including one or more processors (represented generally by the processor 404), a memory 405, and computer-readable media (represented generally by the computer-readable medium 406). The bus 402 may also link various other circuits such as timing sources, peripherals, voltage regulators, and power management circuits. A bus interface 408 provides an interface between the bus 402 and a transceiver 410. The transceiver 410 provides a means for communicating with various other apparatus over a transmission medium. Depending upon the nature of the apparatus, a user interface 412 (e.g., keypad, display, speaker, microphone, joystick) may also be provided.

At least one processor 404 is responsible for managing the bus 402 and general processing, including the execution of software stored on the computer-readable medium 406. The software, when executed by the processor 404, causes the processing system 414 to perform the various functions described below for any particular apparatus. The computer-readable medium 406 and the memory 405 may also be used for storing data that is manipulated by the processor 404 when executing software. In some aspects of the disclosure, the computer-readable medium 406 may include communication instructions 452. The communication instructions 452 may include instructions for performing various operations related to wireless communication (e.g., signal reception and/or signal transmission) as described herein. In some aspects of the disclosure, the computer-readable medium 406 may include processing instructions 454. The processing instructions 454 may include instructions for performing various operations related to signal processing (e.g., processing a received signal and/or processing a signal for transmission) as described herein.

At least one processor 404 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 406. The computer-readable medium 406 may be a non-transitory computer-readable medium. A non-transitory computer-readable medium includes, by way of example, a magnetic storage device (e.g., hard disk, floppy disk, magnetic strip), an optical disk (e.g., a CD or a DVD), a smart card, a flash memory device (e.g., a card, a stick, or a key drive), a RAM, a ROM, a PROM, an EPROM, an EEPROM, a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 406 may reside in the processing system 414, external to the processing system 414, or distributed across multiple entities including the processing system 414. The computer-readable medium 406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, at least one processor 404 may include a communication circuit 440. The communication circuit 440 may include one or more hardware components that provide the physical structure that performs various processes related to wireless communication (e.g., signal reception and/or signal transmission) as described herein. In some aspects of the disclosure, the processor 404 may also include a processing circuit 442. The processing circuit 442 may include one or more hardware components that provide the physical structure that performs various processes related to signal processing (e.g., processing a received signal and/or processing a signal for transmission) as described herein. The circuitry included in the processor 404 is provided as non-limiting examples. Other means for carrying out the described functions exists and is included within various aspects of the present disclosure. In some aspects of the disclosure, the computer-readable medium 406 may store computer-executable code comprising instructions configured to perform various processes described herein. The instructions included in the computer-readable medium 406 are provided as non-limiting examples. Other instructions configured to carry out the described functions exist and are included within various aspects of the present disclosure.

FIG. 5 is a diagram 500 showing an example of a DL-centric subframe. The DL-centric subframe may include a control portion 502. The control portion 502 may exist in the initial or beginning portion of the DL-centric subframe. The control portion 502 may include various scheduling information and/or control information corresponding to various portions of the DL-centric subframe. In some configurations, the control portion 502 may be a physical DL control channel (PDCCH), as indicated in FIG. 5. Additional description related to the PDCCH is provided further below with reference to various other FIGS. The DL-centric subframe may also include a DL data portion 504. The DL data portion 504 may sometimes be referred to as the payload of the DL-centric subframe. The DL data portion 504 may include the communication resources utilized to communicate DL data from the scheduling entity 202 (e.g., eNB) to the subordinate entity 204 (e.g., UE). In some configurations, the DL data portion 504 may be a physical DL shared channel (PDSCH).

The DL-centric subframe may also include a common UL portion 506. The common UL portion 506 may sometimes be referred to as an UL burst, a common UL burst, and/or various other suitable terms. The common UL portion 506 may include feedback information corresponding to various other portions of the DL-centric subframe. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information. As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity 204 (e.g., UE)) to UL communication (e.g., transmission by the subordinate entity 204 (e.g., UE)). One of ordinary skill in the art will understand that the foregoing is merely one example of a DL-centric subframe and alternative structures having similar features may exist without necessarily deviating from the aspects described herein.

Figure 6:
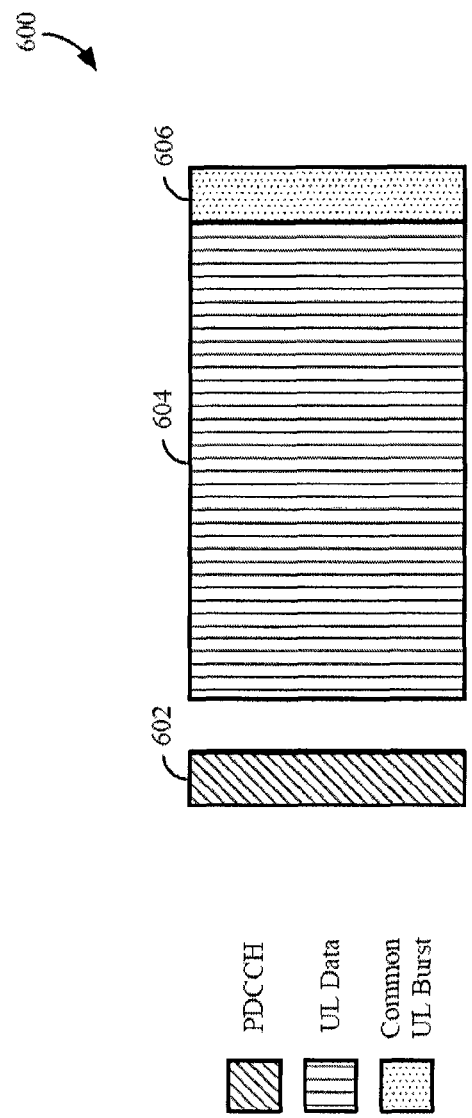
FIG. 6 is a diagram illustrating an example of an uplink (UL)-centric subframe according to some aspects of the present disclosure.

FIG. 6 is a diagram 600 showing an example of an UL-centric subframe. The UL-centric subframe may include a control portion 602. The control portion 602 may exist in the initial or beginning portion of the UL-centric subframe. The control portion 602 in FIG. 6 may be similar to the control portion 502 described above with reference to FIG. 5. The UL-centric subframe may also include an UL data portion 604. The UL data portion 604 may sometimes be referred to as the payload of the UL-centric subframe. The UL portion may refer to the communication resources utilized to communicate UL data from the subordinate entity 204 (e.g., UE) to the scheduling entity 202 (e.g., eNB). As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switch-over from DL communication (e.g., reception operation by the scheduling entity 202 (e.g., UE)) to UL communication (e.g., transmission by the scheduling entity 202 (e.g., UE)). The UL-centric subframe may also include a common UL portion 606. The common UL portion 606 in FIG. 6 may be similar to the common UL portion 506 described above with reference to FIG. 5. The common UL portion 506 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In certain aspects, resource spread multiple access (RSMA) may be used for communication on the UL and/or DL. In particular, RSMA may enable multiple data streams (e.g., data streams of different user equipments, base stations, etc., and/or multiple data streams from a single user equipment, base station, etc.) to share a single resource element (e.g., time and/or frequency resource element, such as similar to TDMA and FDMA resources). For example, RSMA may enable asynchronous, non-orthogonal, and/or contention based access to resources. In certain aspects, data (e.g., bits) of a single data stream may be spread through low rate coding across multiple resource elements in time and/or frequency. Different signals carrying different data may occupy the same resource elements, while being separated (e.g., multiplied) with different codes (e.g., scrambling codes, spreading codes, etc.), similar to CDMA.

However, utilizing a dense pseudo random spreading code for spreading data streams across multiple resource elements may utilize a high level of computing power to decode the data streams (e.g., compute the exact posterior probability of the values of the bits of the decoded data stream). Accordingly, certain aspects herein provide techniques for using a sparse spreading code (e.g., some elements of the spreading sequences are set to zeros, such as, some data streams are not spread/carried onto some resources) for spreading data streams across resources for transmission. In particular, certain aspects provide techniques for using a sparse spreading code, which forms an acyclic tree graph structure. Such a spreading code that can be represented by a graph without a cycle may utilize less computational complexity (e.g., less computing power) to compute the posterior probability of the values of the bits of the decoded data stream. Accordingly, a decoding device (e.g., user equipment, base station, etc.) that receives the transmitted data streams can use less computational resources (e.g., time, power, etc.) to decode a data stream. The techniques described herein may be utilized on an UL and a DL. For example, the techniques can be used for multiple user equipments transmitting to a receiving base station, multiple base stations transmitting to a receiving user equipment, a base station transmitting to multiple user equipments, etc.

Figure 7:
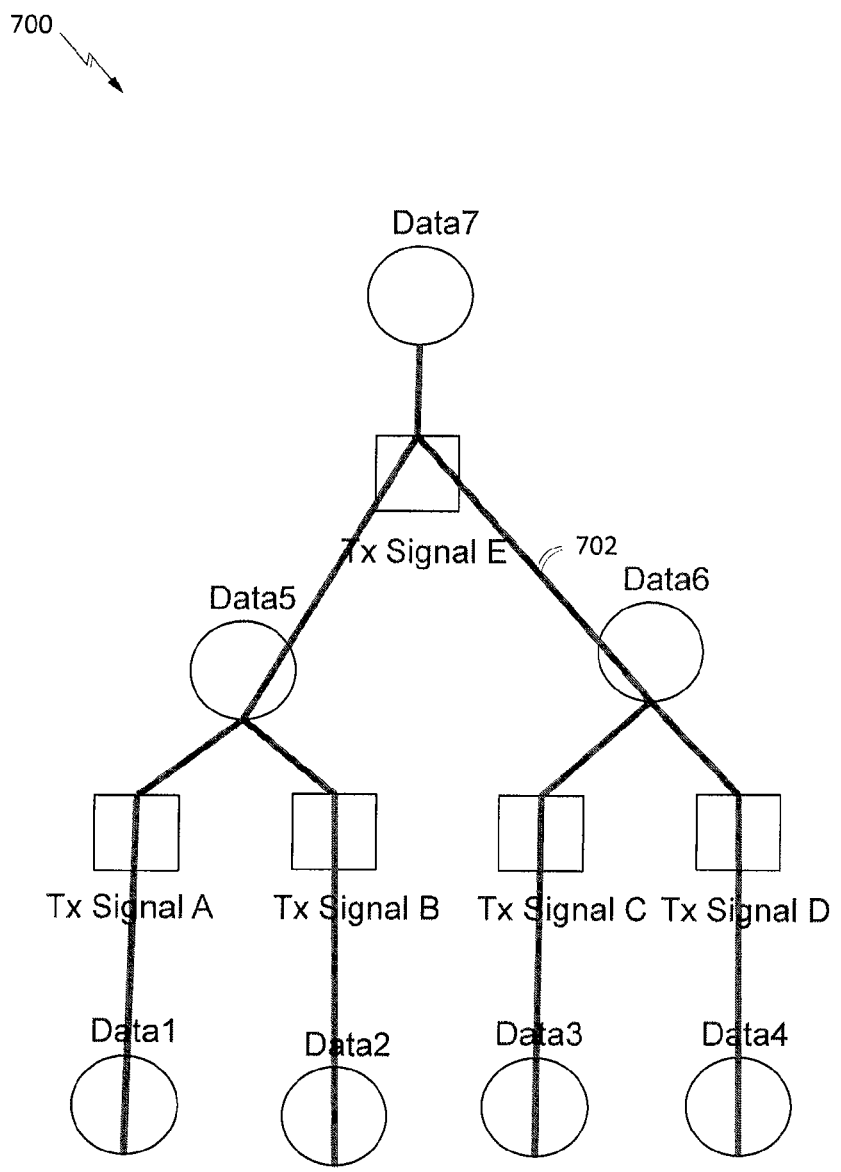
FIG. 7 is an acyclic tree graph illustrating an example allocation of resources to data streams according to some aspects of the present disclosure.

FIG. 7 is an acyclic tree graph 700 illustrating an example allocation of resources to data streams. In particular, each odd level of the acyclic tree graph 700 includes data streams as nodes, and each even level of the acyclic tree graph 700 includes resources (e.g., time and/or frequency resources) as nodes. For example, acyclic tree graph 700 illustrates seven data streams: Data1, Data2, Data3, Data4, Data5, Data6, and Data7. Further, acyclic tree graph 700 illustrates five resources for transmitting data streams: Tx Signal A, Tx Signal B, Tx Signal C, Tx Signal D, and Tx Signal E. The data stream Data7 is shown as the root of the acyclic tree graph 700 at level 1. The resource Tx Signal E is shown at level two of the acyclic tree graph 700. The data streams Data5 and Data6 are shown at level three of the acyclic tree graph 700. The resources Tx Signal A, Tx Signal B, Tx Signal C, and Tx Signal D are shown at level four of the acyclic tree graph 700. The data streams Data1, Data2, Data3, and Data4 are shown at level five of the acyclic tree graph 700.

In some aspects, the resource nodes of an acyclic tree graph as discussed herein may correspond to a plurality of resource elements. For example, Tx Signal A may correspond to multiple (e.g., 4) resource elements (e.g., time/frequency resources). A data stream may be transmitted on the resources of the resource node by spreading the signal over multiple resource elements, such as by multiplying the data stream by orthogonal sequences for each of the resource elements. For example, Tx Signal A may be spread onto 4 resource elements by multiplying Tx Signal A by the spreading code [1,1,1,1] to result in the transmitted signal. Further, Tx Signal B may be spread onto 4 resource elements by multiplying Tx Signal B by the spreading code [1,1,−1,−1] to result in the transmitted signal. Further, Tx Signal C may be spread onto 4 resource elements by multiplying Tx Signal C by the spreading code [1,−1,−1,1] to result in the transmitted signal. Further, Tx Signal D may be spread onto 4 resource elements by multiplying Tx Signal D by the spreading code [1,−1,1,−1] to result in the transmitted signal.

The nodes are connected as shown by edges 702. In particular, edges are shown connecting resources to data streams. The edges 702 indicate the resources allocated to a data stream for communication. In particular, data stream Data1 is connected to resource Tx Signal A, and therefore, Data1 is allocated to be communicated on resource Tx Signal A, but not the remaining resources. Similarly, Data2, Data3, and Data4 are allocated to Tx Signal B, Tx Signal C, and Tx Signal D, respectively. Data5 is allocated to each of Tx Signal A, Tx Signal B, and Tx Signal E. Further, Data6 is allocated to Tx Signal C, Tx Signal D, and Tx Signal E. Data7 is allocated to Tx Signal E. The allocation of each data stream to a set of resources may be referred to as the spreading code for spreading the data stream onto the allocated resources. In certain aspects, the spreading code for spreading the data stream onto the allocated resources may be different from a spreading code used to scramble/multiply the data stream by for transmission on a given resource.

In certain aspects, repetition and scrambling (similar to CDMA) may be used for communicating the data streams on the allocated resources. For example, as discussed, Data5 is allocated to each of Tx Signal A, Tx Signal B, and Tx Signal E. Accordingly, in certain aspects, data stream Data5 is transmitted on each of Tx Signal A, Tx Signal B, and Tx Signal E. In certain aspects, the data for data stream Data5 may be processed (e.g., modulated), such as, modulated to a quadrature phase shift keying (QPSK) signal Q. In certain aspects, the data stream Data5 may then be spread/repeated on each of Tx Signal A, Tx Signal B, and Tx Signal E. Further, in certain aspects, the data stream Data5 (e.g., Q) may be scrambled (e.g., multiplied by a spreading code (e.g., similar to CDMA)) before being spread/repeated and transmitted on each of Tx Signal A, Tx Signal B, and Tx Signal E. In certain aspects, the scrambling (e.g., spreading code) applied to data stream Data5 may be different for each resource data stream Data5 is repeated on. Accordingly, the resources not used for transmitting data stream Data5 (e.g., Tx Signal C and Tx Signal D), are the zero elements of the spreading code for spreading Data5 across the resources Tx Signal A, Tx Signal B, Tx Signal C, Tx Signal D, and Tx Signal E. Accordingly, in some aspects, the data stream Data5 may be transmitted on Tx Signal A, Tx Signal B, Tx Signal C, Tx Signal D, and Tx Signal E as follows (Seq1*Q, Seq2*Q, 0, 0, Seq3*Q), where Q is the modulated data stream Data5, and Seq1-Seq3 are different spreading codes for multiplying Q to scramble the modulated data. Similar processes are used to transmitting each of data streams Data1, Data2, Data3, Data4, Data6, and Data7.

Figure 8:
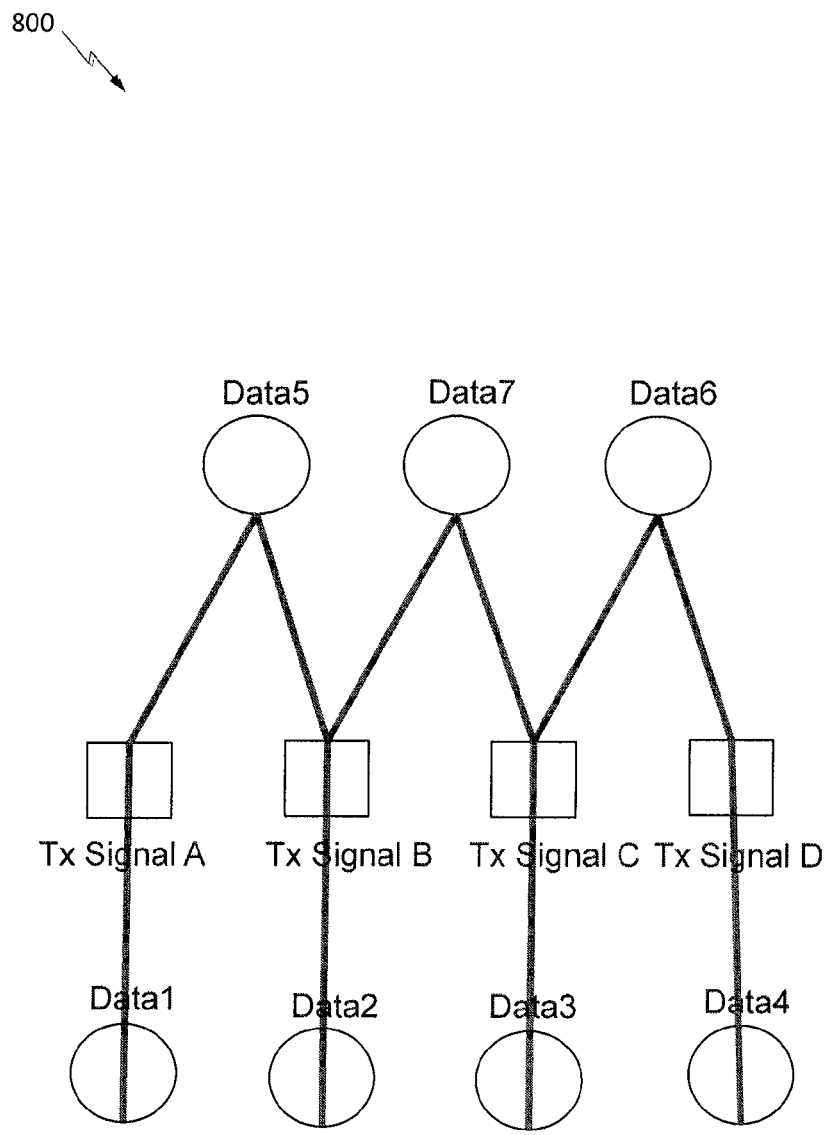
FIG. 8 is an acyclic tree graph illustrating another example allocation of resources to data streams according to some aspects of the present disclosure.

In certain aspects, the allocation of resources to data streams can be represented by any appropriate acyclic tree graph where each odd level of the acyclic tree graph includes data streams as nodes, each even level of the acyclic tree graph includes resources as nodes, and resources are connected to data streams at adjacent levels. For example, FIG. 8 is an acyclic tree graph 800 illustrating another example allocation of resources to data streams. As shown, each of data streams Data5, Data6, and Data7 are at level 1 of the acyclic tree graph 800. Further, each of resources Tx Signal A, Tx Signal B, Tx Signal C, and Tx Signal D are at level two of the acyclic tree graph 800. Finally, each of data streams Data1, Data2, Data3, and Data4 are at level 3 of the acyclic tree graph 800. Data1, Data2, Data3, and Data4 are allocated to Tx Signal A, Tx Signal B, Tx Signal C, and Tx Signal D, respectively. Data5 is allocated to Tx Signal A and Tx Signal B. Data6 is allocated to Tx Signal C and Tx Signal D. Data7 is allocated to Tx Signal B and Tx Signal C.

Figure 9:
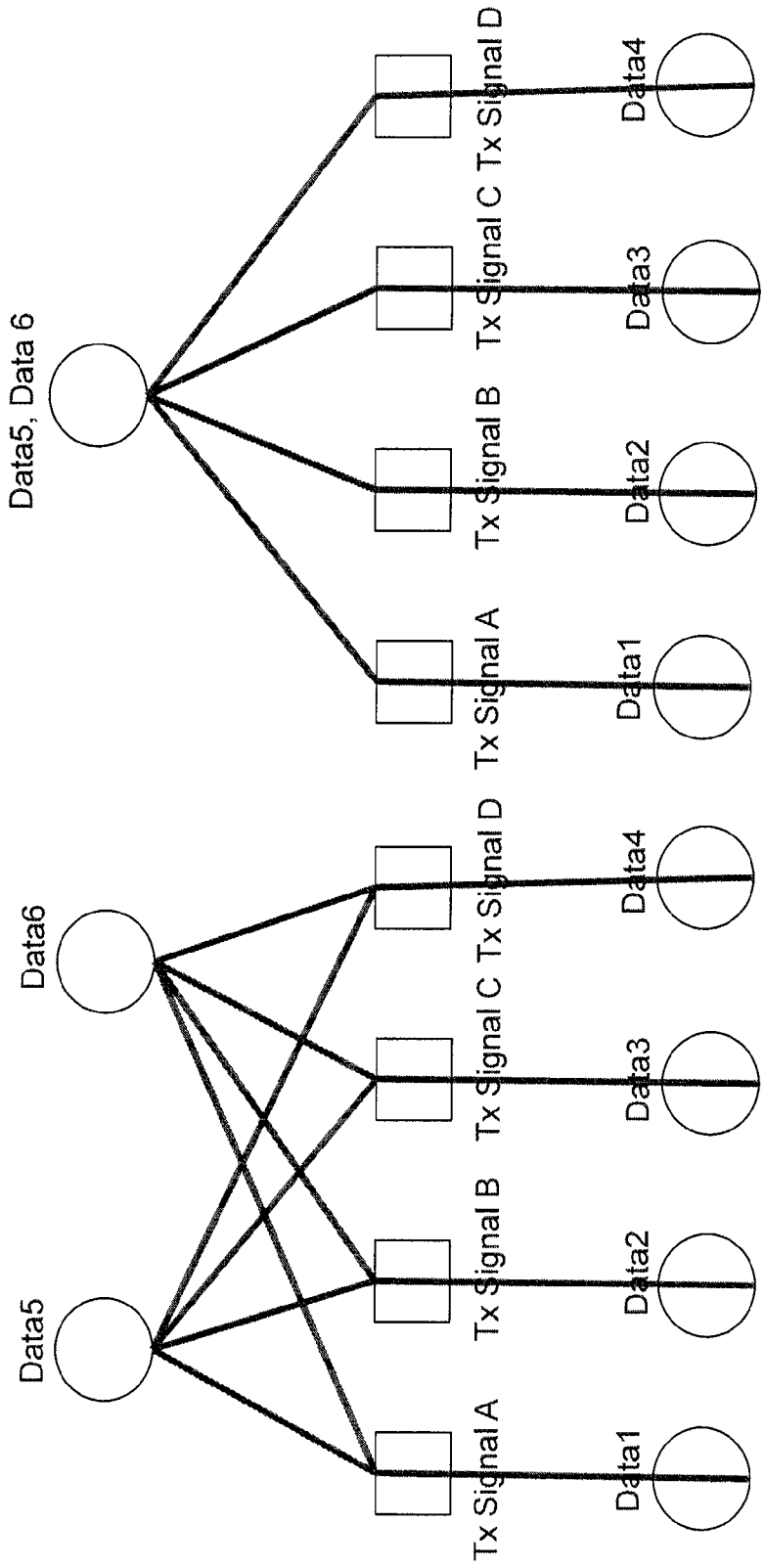
FIG. 9A is a graph illustrating an example allocation of resources to data streams.
FIG. 9B is an acyclic graph illustrating an example allocation of resources to data streams of FIG. 9A.

In some aspects, even if the allocation of data streams to resources does not form an acyclic graph, a receiver of the data streams on the resources may form an acyclic graph from the allocation of resources by treating multiple data stream nodes as one data stream node (e.g., and applying the message passing algorithm accordingly). For example, FIG. 9A is a graph illustrating an example allocation of resources to data streams. As seen, the graph of FIG. 9A is cyclic. However, by merging the data streams Data5 and Data6 together into a single node, as illustrated in FIG. 9B, the resulting graph in FIG. 9B is an acyclic tree graph as discussed herein. Accordingly, the same techniques described herein can be applied to the allocation of data streams and resources represented by the graph of FIG. 9B.

As discussed, data streams allocated and transmitted according to an acyclic tree graph as described herein may be decoded using less computational complexity. For example, the data streams may be decoded by receiving devices utilizing a particular decoding algorithm (e.g., a message passing decoding algorithm). In particular, a message passing algorithm may give an exact posterior probability when decoding the data of a data stream at a device receiving the data stream. In a message passing algorithm, each device associated with a data stream may generate the probability of the value of data transmitted on a particular resource based on information at the device associated with the data stream and pass messages to other devices associated with data streams, which are used to decode the transmitted data of the data streams.

An example message passing decoding algorithm is described as follows. In the following discussion of the message passing between data streams, it should be noted that the messages passed for decoding are different than the messages including actual data transmitted between data streams. Each data stream may include M-ary data, where a single transmission resource (e.g., symbol) represents multiple bits N of data of the data stream. In particular, $M=2^N$. If 4 bits of data are transmitted simultaneously on a resource at a time, there are 16 possible bit patterns (i.e., 0000, 0001, 0010, . . . , 1111) for the data, and therefore the data is 16-ary data. A vector of length M may accordingly represent the possible bit patterns for N bits. Accordingly, without any other knowledge, the probability for each possible bit pattern that a given transmission/message (i.e., N bits) of a data stream is that bit pattern is 1/M. In particular, the probability of each possible bit pattern, without any other knowledge, can be represented by the vector of length M with values of 1/M for each element of the vector (1/M, 1/M, . . . , 1/M).

For any data streams (e.g., Data1, Data2, Data 3, and Data 4 in acyclic graph 700) that only have one connected edge, the device associated with the data stream sends messages as to the probability of the value of each data transmission on resources below the data stream connected to the data stream as a vector with length M, where the vector indicates the probabilities of the value of data transmitted (e.g., (1/M, 1/M, . . . , 1/M)).

For data streams that have more than one connected edge (e.g., Data5 and Data6 in acyclic graph 700), the device (e.g., base station, user equipment, etc.) associated with the data stream may, for each edge at a level below the data stream, transmit on the resource connected by that edge, a new message based on the data received on resources above the data stream connected by the other edges connected to the data stream. For example, Data5 of acyclic graph 700 is coupled to each of Tx Signal A, Tx Signal B, and Tx Signal E. The device associated with Data5 may receive data from data streams Data1 and Data2 above the data stream Data5 on each of resources Tx Signal A and Tx Signal B at a level above Data5, respectively. The device may calculate the product (e.g., cross product) of the data from data streams Data1 and Data2 and pass the product as a message on Tx Signal E at a level below Data5.

For resources with more than one connected edge from levels above the resource (e.g., Tx Signal E in acyclic graph 700) the device(s) associated with data stream(s) connected to the resource at a level below the resource (e.g., Data7), may receive messages on the resource and compute a new message based on the received messages (e.g., the new message may represent the posterior probability of each of the messages). The device associated with each such data stream may pass the messages (directly or indirectly) to the remaining devices associated with remaining data streams. For example, the device associated with the data stream (e.g., Data7 of acyclic graph 700) may pass the message on the resources it shares an edge with to devices associated with data streams at a level above the data stream (e.g., Data5 and Data6 of acyclic graph 700). Similarly, the devices associated with data streams at that level (e.g., Data5 and Data6 of acyclic graph 700) may pass the message to the devices associated with data streams at the next higher level (e.g., Data1-Data4), etc. Each device associated with the data streams may then have the posterior probability of each of the messages (bits) transmitted by each of the devices associated with data streams.

Figure 10:
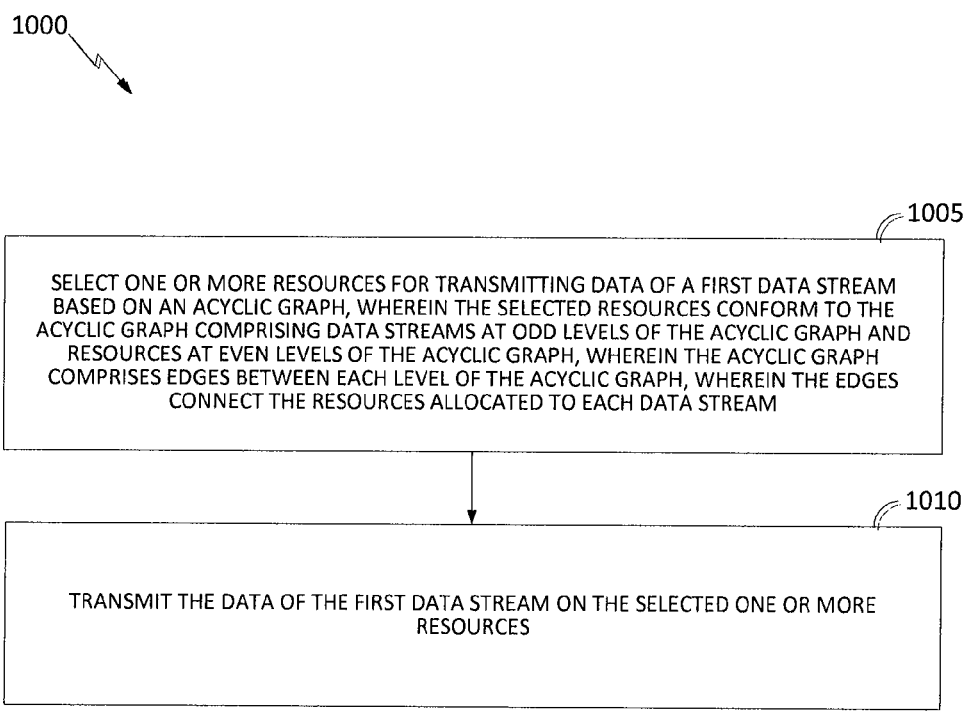
FIG. 10 is a diagram illustrating example operations for utilizing resources according to an acyclic tree graph to communicate data according to some aspects of the present disclosure.

FIG. 10 is a diagram 1000 illustrating an example of various methods and/or processes according to some aspects of the present disclosure. In some configurations, such methods and/or processes may be performed and/or implemented in the subordinate entity 204 or the scheduling entity 202.

At 1005, one or more resources for transmitting data of a first data stream are selected based on an acyclic graph. In some aspects, the selected resources conform to the acyclic graph comprising data streams at odd levels of the acyclic graph and resources at even levels of the acyclic graph. In some aspects, the acyclic graph comprises edges between each level of the acyclic graph. In some aspects, the edges connect the resources allocated to each data stream.

At 1010, the selected one or more resources are used to transmit the data of the first data stream.

In some configurations, the term(s) 'communicate,' 'communicating,' and/or 'communication' may refer to 'receive,' 'receiving,' 'reception,' and/or other related or suitable aspects without necessarily deviating from the scope of the present disclosure. In some configurations, the term(s) 'communicate,' 'communicating,' 'communication,' may refer to 'transmit,' 'transmitting,' 'transmission,' and/or other related or suitable aspects without necessarily deviating from the scope of the present disclosure.

Several aspects of a wireless communication network have been presented with reference to an exemplary implementation. As those skilled in the art will readily appreciate, various aspects described throughout this disclosure may be extended to other telecommunication systems, network architectures and communication standards. By way of example, various aspects may be implemented within other systems defined by 3GPP, such as LTE, the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), 5G, new radio (NR), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated herein may be rearranged and/or combined into a single component, step, feature or function or embodied in several components, steps, or functions. Additional elements, components, steps, and/or functions may also be added without departing from novel features disclosed herein. The apparatus, devices, and/or components illustrated herein may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of communication by an apparatus, the method comprising:
    selecting one or more resources for transmitting data of a first data stream based on an acyclic graph, wherein the selected one or more resources conform to the acyclic graph comprising data streams at odd levels of the acyclic graph and resources at even levels of the acyclic graph, wherein the acyclic graph comprises edges between each level of the acyclic graph, wherein the edges connect the resources allocated to each data stream; and
    transmitting the data of the first data stream on the selected one or more resources by spreading the data over the selected one or more resources according to the acyclic graph, thereby utilizing less computational complexity when decoding the first data stream.

2. The method of claim 1, further comprising multiplying the data of the first data stream by a different spreading code for each of the selected one or more resources, and repeating transmitting of the data of the first data stream on each of the selected one or more resources.

3. The method of claim 1, wherein each data stream is associated with one of a user equipment and a base station.

4. The method of claim 1, wherein the one or more resources comprise one or more time resources or one or more frequency resources.

5. The method of claim 1, wherein at least one node of the acyclic graph corresponds to a plurality of data streams.

6. The method of claim 1, wherein at least one node of the acyclic graph corresponds to a plurality of resources.

7. The method of claim 6, wherein transmitting the data of the first data stream comprises spreading the data over the selected one or more resources using an orthogonal sequence.

8. The method of claim 1, wherein the acyclic graph comprises at least three levels.

9. An apparatus for communication, the apparatus comprising:
means for selecting one or more resources for transmitting data of a first data stream based on an acyclic graph, wherein the selected one or more resources conform to the acyclic graph comprising data streams at odd levels of the acyclic graph and resources at even levels of the acyclic graph, wherein the acyclic graph comprises edges between each level of the acyclic graph, wherein the edges connect the resources allocated to each data stream; and
means for transmitting the data of the first data stream on the selected one or more resources by spreading the data over the elected one or more resources according to the acyclic graph, thereby utilizing less computational complexity when decoding the first data stream.

10. The apparatus of claim 9, further comprising means for multiplying the data of the first data stream by a different spreading code for each of the selected one or more resources, and means for repeating transmitting of the data of the first data stream on each of the selected one or more resources.

11. The apparatus of claim 9, wherein each data stream is associated with one of a user equipment and a base station.

12. The apparatus of claim 9, wherein the one or more resources comprise one or more time resources or one or more frequency resources.

13. The apparatus of claim 9, wherein at least one node of the acyclic graph corresponds to a plurality of data streams.

14. The apparatus of claim 9, wherein at least one node of the acyclic graph corresponds to a plurality of resources.

15. The apparatus of claim 14, wherein means for transmitting the data of the first data stream comprises means for spreading the data over the selected one or more resources using an orthogonal sequence.

16. An apparatus for communication, the apparatus comprising:
a memory; and
a processor configured to:
select one or more resources for transmitting data of a first data stream based on an acyclic graph, wherein the selected one or more resources conform to the acyclic graph comprising data streams at odd levels of the acyclic graph and resources at even levels of the acyclic graph, wherein the acyclic graph comprises edges between each level of the acyclic graph, wherein the edges connect the resources allocated to each data stream; and
transmit the data of the first data stream on the selected one or more resources by spreading the data over the selected one or more resources according to the acyclic graph, thereby utilizing less computational complexity when decoding the first data stream.

17. The apparatus of claim 16, wherein the processor is further configured to multiply the data of the first data stream by a different spreading code for each of the selected one or more resources, and repeat transmitting of the data of the first data stream on each of the selected one or more resources.

18. The apparatus of claim 16, wherein each data stream is associated with one of a user equipment and a base station.

19. The apparatus of claim 16, wherein the one or more resources comprise one or more time resources or one or more frequency resources.

20. The apparatus of claim 16, wherein at least one node of the acyclic graph corresponds to a plurality of data streams.

21. The apparatus of claim 16, wherein at least one node of the acyclic graph corresponds to a plurality of resources.

22. The apparatus of claim 21, wherein to transmit the data of the first data stream comprises to spread the data over the selected one or more resources using an orthogonal sequence.

23. A non-transitory computer readable medium having stored thereon instructions for performing a method of communication by an apparatus, the method comprising:
selecting one or more resources for transmitting data of a first data stream based on an acyclic graph, wherein the selected one or more resources conform to the acyclic graph comprising data streams at odd levels of the acyclic graph and resources at even levels of the acyclic graph, wherein the acyclic graph comprises edges between each level of the acyclic graph, wherein the edges connect the resources allocated to each data stream; and
transmitting the data of the first data stream on the selected one or more resources by spreading the data over the selected one or more resources according to the acyclic graph, thereby utilizing less computational complexity when decoding the first data stream.

24. The non-transitory computer readable medium of claim 23, wherein the method further comprises multiplying the data of the first data stream by a different spreading code for each of the selected one or more resources, and repeating transmitting of the data of the first data stream on each of the selected one or more resources.

25. The non-transitory computer readable medium of claim 23, wherein each data stream is associated with one of a user equipment and a base station.

26. The non-transitory computer readable medium of claim 23, wherein the one or more resources comprise one or more time resources or one or more frequency resources.

27. The non-transitory computer readable medium of claim 23, wherein at least one node of the acyclic graph corresponds to a plurality of data streams.

28. The non-transitory computer readable medium of claim 23, wherein at least one node of the acyclic graph corresponds to a plurality of resources.

29. The non-transitory computer readable medium of claim 28, wherein transmitting the data of the first data stream comprises spreading the data over the selected one or more resources using an orthogonal sequence.

* * * * *